United States Patent
Steffey et al.

(10) Patent No.: US 9,720,681 B2
(45) Date of Patent: Aug. 1, 2017

(54) DEVICE PROGRAMMING SYSTEM WITH DATA BROADCAST AND METHOD OF OPERATION THEREOF

(75) Inventors: Derek P. Steffey, Redmond, WA (US); Andrew B. Caley, Redmond, WA (US)

(73) Assignee: Data I/O Corporation, Redmond, WA (US)

(*) Notice: Subject to any disclaimer, the term of this patent is extended or adjusted under 35 U.S.C. 154(b) by 94 days.

(21) Appl. No.: 13/186,875

(22) Filed: Jul. 20, 2011

(65) Prior Publication Data

US 2013/0024603 A1    Jan. 24, 2013

(51) Int. Cl.
*G06F 12/02* (2006.01)
*G06F 9/445* (2006.01)

(52) U.S. Cl.
CPC .............. *G06F 8/665* (2013.01); *G06F 12/02* (2013.01)

(58) Field of Classification Search
CPC ....................................................... G06F 12/02
USPC ......................................................... 711/103
See application file for complete search history.

(56) References Cited

U.S. PATENT DOCUMENTS

| | | | |
|---|---|---|---|
| 5,970,013 A | 10/1999 | Fischer et al. | |
| 6,584,553 B2 | 6/2003 | Howell | |
| 6,629,284 B1* | 9/2003 | Leermakers | 714/748 |
| 6,775,644 B2 | 8/2004 | Myers | |
| 6,865,599 B2 | 3/2005 | Zhang | |
| 7,240,336 B1* | 7/2007 | Baker | G06F 9/455 |
| | | | 714/E11.207 |
| 7,289,964 B1* | 10/2007 | Bowman-Amuah | 705/1.1 |
| 7,290,056 B1 | 10/2007 | McLaughlin, Jr. | |
| 7,302,562 B1 | 11/2007 | Jacobson et al. | |
| 2003/0093530 A1* | 5/2003 | Syed | H04H 20/103 |
| | | | 709/226 |
| 2007/0101146 A1* | 5/2007 | Louch et al. | 713/176 |
| 2008/0005086 A1* | 1/2008 | Moore | 707/3 |
| 2008/0022012 A1* | 1/2008 | Wang | 709/238 |
| 2008/0195856 A1 | 8/2008 | Ford et al. | |
| 2008/0273405 A1 | 11/2008 | Byun et al. | |
| 2010/0100899 A1* | 4/2010 | Bradbury et al. | 725/29 |
| 2010/0115176 A1 | 5/2010 | Sarin et al. | |
| 2010/0313250 A1* | 12/2010 | Chow | 726/5 |
| 2011/0047595 A1* | 2/2011 | Diep et al. | 726/3 |
| 2011/0292165 A1* | 12/2011 | Berger et al. | 348/14.12 |

(Continued)

FOREIGN PATENT DOCUMENTS

CN    1341309 A    3/2002

OTHER PUBLICATIONS

Office Action for CN Application No. 20128035609.1 dated Dec. 3, 2015.

*Primary Examiner* — Tuan Thai
*Assistant Examiner* — Gautam Sain
(74) *Attorney, Agent, or Firm* — Wong & Rees LLP

(57) ABSTRACT

A method of operation of a device programming system includes: providing a target programmer, having a programming bus; coupling an electronic device, having a non-volatile memory, to the target programmer by the programming bus; and programming a data image into the non-volatile memory by the target programmer includes: subscribing to a broadcast message, receiving a logical block, of the data image, by the broadcast message for programming the non-volatile memory, and sending an unsubscribe message after receiving the logical blocks of the data image from the broadcast message.

20 Claims, 5 Drawing Sheets

(56) References Cited

U.S. PATENT DOCUMENTS

2012/0042004 A1\* 2/2012 Shenfield ............... 709/203
2012/0151532 A1\* 6/2012 Del Sordo et al. ............ 725/59
2012/0197963 A1\* 8/2012 Bouw et al. ................ 709/202
2012/0323349 A9\* 12/2012 Khedouri et al. ............. 700/94

\* cited by examiner

DEVICE PROGRAMMING SYSTEM WITH DATA BROADCAST AND METHOD OF OPERATION THEREOF

TECHNICAL FIELD

The present invention relates generally to a device programming system, and more particularly to a system for managing files for programming non-volatile memory in devices.

BACKGROUND ART

Electronic equipment uses memory devices, for example, flash memories, for storing data or information. In a memory system, a memory controller may program a selected non-volatile memory device by transmitting data to a buffer in a selected non-volatile memory device where it is stored temporarily. Programming of the data from the buffer into the non-volatile memory commences and the programming result is verified and a verify result is produced as "pass" or "fail".

Program and verify operations are performed several times for a specified period, which may be considered the "programming time". After the programming time, in the event of failure, the data is re-loaded from the memory controller to resume the page program operation in the same selected device.

In batch programming devices, the memory controller may address several target programming devices concurrently. Each of the target programming devices can forward the files with program data to several electronic devices with non-volatile memory that accept the program data in order to enable their intended operation. Based on this distribution mechanism, a single memory controller can transmit the program data to hundreds of the electronic devices in a concurrent operation.

A drawback is that flash memories require a long programming time, for example, to verify the program status. The memory inside of the memory controller must hold the initial program data in order to recover the original program data in the event of program failure. The initial program data occupies space in the memory of the memory controller, with the result that the memory space cannot be used for other purposes. Since the individual electronic devices may require different durations of time to complete the programming operation, this could represent significant delays to the memory controller. A single slow device could potentially delay the completion of the programming operation and severely limit the throughput of the memory controller.

Thus, a need still remains for a device programming system with data broadcast. In view of the requirement to improve the manufacturing efficiencies and optimize the utilization of manufacturing equipment, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a device programming system including: providing a target programmer, having a programming bus; coupling an electronic device, having a non-volatile memory, to the target programmer by the programming bus; and programming a data image into the non-volatile memory by the target programmer includes: subscribing to a broadcast message, receiving a logical block, of the data image, by the broadcast message for programming the non-volatile memory, and sending an unsubscribe message after receiving the logical blocks of the data image from the broadcast message.

The present invention provides a device programming system, including: a target programmer, having a programming bus; an electronic device, having a non-volatile memory, coupled to the target programmer by the programming bus; and a data image programmed into the non-volatile memory by the target programmer includes: a host server subscribed for sending a broadcast message, and a data buffer in the target programmer for receiving the broadcast message.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
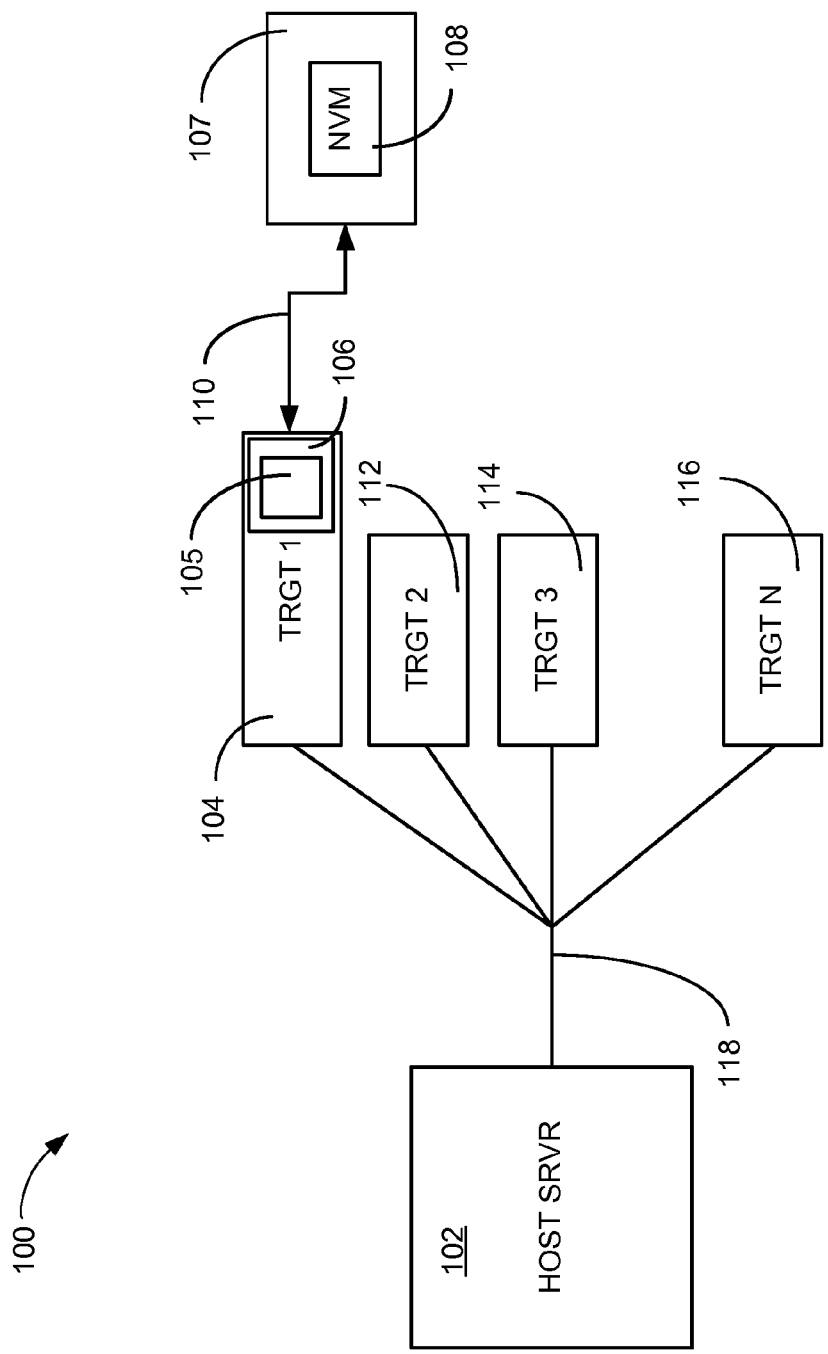
FIG. 1 is a functional block diagram of a device programming system with data broadcast in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

For expository purposes, the term "horizontal" as used herein is defined as a plane parallel to the plane or surface of the Earth, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between elements.

The term "processing" as used herein includes transferring of files containing data to be programmed, storing data to be programmed, and instantiating the data to be programmed into a non-volatile memory within an electronic device. The term "broadcast" as used herein means transmitting a single message by a host computer system that can be received by any number of target programmers concurrently. The term "logical block" as used herein means a portion of a data image that can be sequentially or individually addressed. The logical block can be defined by the host computer system to be one or more bytes of data. The term "coupling" means establishing a signal path through a media. The term "wireless media" means a wireless transmitter, a wireless receiver, and the wireless frequency on which they operate.

Referring now to FIG. 1, therein is shown a functional block diagram of a device programming system 100 with data broadcast in an embodiment of the present invention. The functional block diagram of the device programming system 100 depicts a host server 102, such as a computer system capable of managing and distributing data images containing data for use in programming electronic devices containing non-volatile memory.

A first target programmer 104 can be a device programming system capable of receiving a data image 105, in a data buffer 106, from the host server 102, preparing the data image 105, and programming an electronic device 107. The data buffer 106 can be partially allocated or completely committed to a programming stream for programming the electronic device 107. The programming of the electronic device 107 can include copying the content of the data image 105 to a non-volatile memory 108 within the electronic device 107 and verifying the proper operation of the electronic device 107 and the content of the non-volatile memory 108.

The first target programmer 104 can communicate with the electronic device 107 when coupled through a programming bus 110. The programming bus 110 can be a parallel bus or a serial communication bus. While only one of the electronic device 107 is shown coupled to the programming bus 110, this is an example only and any number of the electronic device 107 may be coupled to the first target programmer 104 through the programming bus 110 or additional instances (not shown) of the programming bus 110.

The first target programmer 104 may maintain a segment of its memory for each of the electronic device 107 that is actually connected for programming. There may be different types of the electronic device 107 that require service from the first target programmer 104 with concurrent pending programming operations. As the number and type of the electronic device 107 increases, the resources of the first target programmer 104 may become depleted.

In this case, a second target programmer 112 may be configured in the same manner as the first target programmer 104. In very busy manufacturing environments the programming facilities may include a third target programmer 114 and so on, up to an Nth target programmer 116. Each of the first target programmers 104 through the Nth target programmer 116 may be actively programming any number of the electronic device 107 concurrently.

In order to facilitate the distribution of the data images, used by the first target programmer 104 through the Nth target programmer 116 to program the electronic device 107, the host server 102 may be coupled through a data broadcast bus 118. The data broadcast bus 118 can be implemented over a network structure such as a local area network, a wide area network, or a public access network such as the Internet. The data broadcast bus 118 can comprise wired media, optical media, wireless media, or a combination thereof.

The data image 105 may be transmitted, over the data broadcast bus 118, by the host server 102 in an encrypted state. An encryption key (not shown) can be established in the first target programmer 104 through the Nth target programmer 116 prior to the transmission of the data image 105.

It is understood that each of the first target programmer 104 through the Nth target programmer 116 may actively program any number of the electronic device 107 and the data image 105 used for each can be different or the same. As each of the first target programmer 104 through the Nth target programmer 116 stores a number of the different versions of the data image 105, additional versions of the data image 105 may be required to be transferred for programming activity. It is further understood that the hardware configuration of the first target programmer 104 through the Nth target programmer 116 is substantially the same.

It would be understood by one having ordinary skill in the art that the first target programmer 104 through the Nth target programmer 116 may be concurrently programming the same type of the electronic device 107 or different types of the electronic device 107. When any of the first target programmer 104 through the Nth target programmer 116 are programming the same type of the electronic device 107 they will store the same broadcast messages. It is also understood that the electronic device 107 may be programmed at different rates on the first target programmer 104 through the Nth target programmer 116 so the broadcast messages may be stored in a different sequence as long as all of the data image 105 is programmed to the non-volatile memory 108.

It is further understood that while the present example shows four of the target programming device coupled to the data broadcast bus 118, in practice any number of the target programming device may be used.

Figure 2:
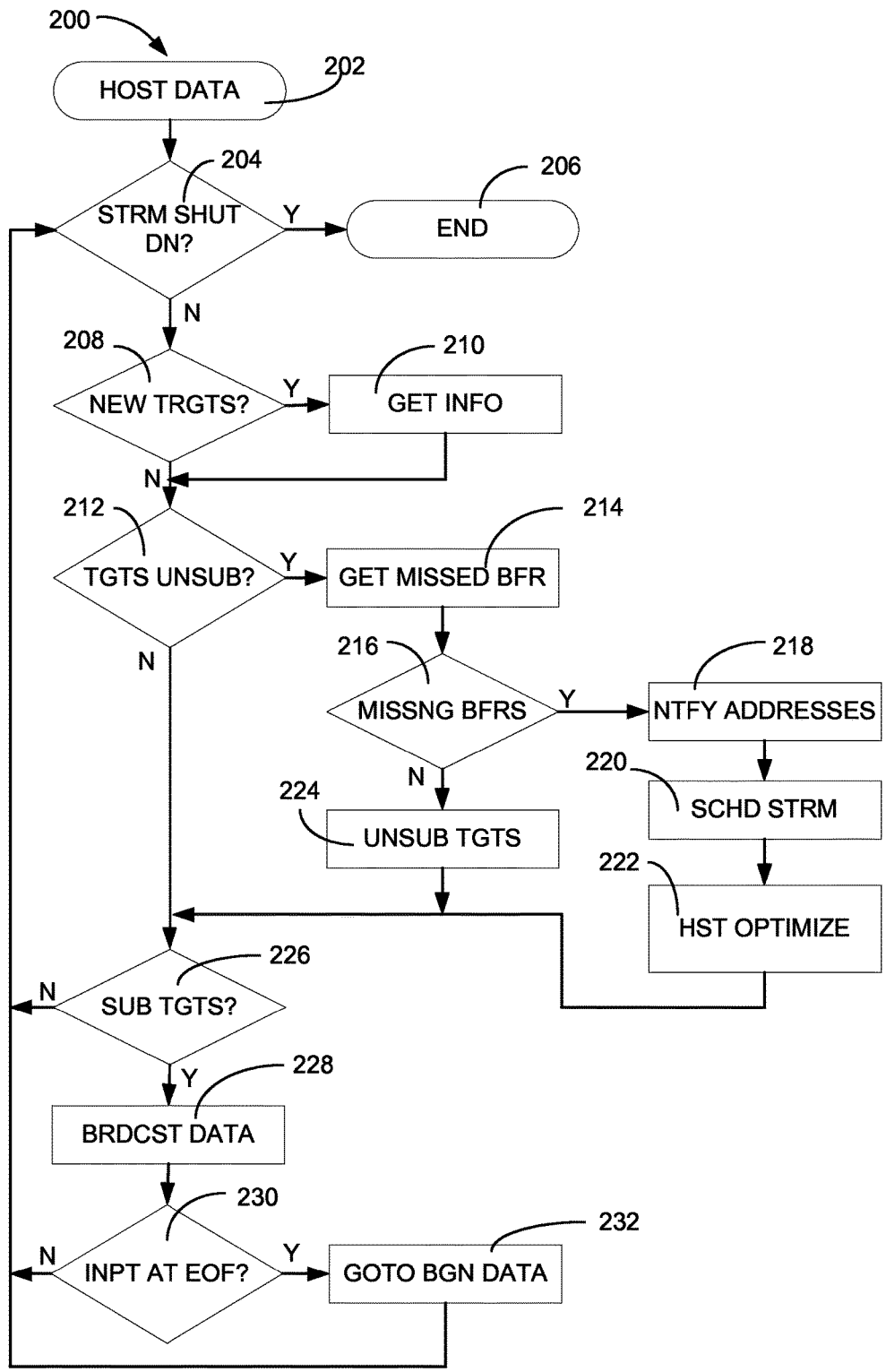
FIG. 2 is an operational flow diagram of a host data transfer in an embodiment of the present invention.

Referring now to FIG. 2, therein is shown an operational flow diagram of a host data transfer 200 in an embodiment of the present invention. The operational flow diagram of the host data transfer 200 depicts a host data entry 202. In the host data entry 202 the data image 105, of FIG. 1, can be ready for distribution to the first target programmer 104, of FIG. 1, through the Nth target programmer 116, of FIG. 1.

It has been discovered that the device programming system 100, of FIG. 1, can make use of the electronic device 107, of FIG. 1, can contain the non-volatile memory 108, of FIG. 1, which can be programmed in any address order as long as the address locations are correctly programmed. It was further discovered that the architecture of the non-volatile memory 108 can provide optimizations that can be realized from programming sequential addresses, with-in the non-volatile memory 108. In order to take advantage of the architecture of the non-volatile memory 108, the host data transfer 200, provides block transfers that can minimize the amount of random access writes required to program the electronic device 107.

The host data entry 202 proceeds to a stream shut-down check 204. The stream shut-down check 204 can be implemented as a combination of a hardware device that keeps track of active transactions, firmware that operates in conjunction with the hardware device, and software that executes on the host server 102, of FIG. 1. The stream shut-down check 204 detects whether there are any remaining transfers, associated with programming the electronic device 107, required by the first target programmer 104 through the Nth target programmer 116.

If the stream shut-down check 204 determines that all of the transactions associated with a specific program stream are complete, the flow proceeds to a program end 206. The program end 206 can provide an accounting of the statistics associated with the programming of the electronic device 107. The statistics can include the number of the electronic device 107 that were programmed by the first target programmer 104 through the Nth target programmer 116, the elapsed time for programming the electronic device 107, the number of the electronic device 107 that were successfully programmed, the number of the electronic device 107 that failed to program correctly, the programming yield for each of the first target programmer 104 through the Nth target programmer 116, or a combination thereof.

If the stream shut-down check 204 determines that any of the transactions are not complete, the flow proceeds to a check for new targets block 208. The check for new targets block 208 can be implemented as a combination of a hardware device that keeps track of all active transactions, firmware that operates in conjunction with the hardware device, and software that executes on the host server 102. The check for new targets block 208 determines whether any of the first target programmer 104 through the Nth target programmer 116 has been added to an existing stream or whether a new programming stream has been initiated.

If the check for new targets block 208 determines that additional units of the first target programmer 104 through the Nth target programmer 116 have been added to the programming stream, the flow proceeds to a get target information block 210. The asynchronous addition of any of the first target programmer 104 through the Nth target programmer 116 will be correctly managed by the host server 102 and the additional unit will receive the next in the series of broadcast messages.

The get target information block 210 can be implemented as a combination of a hardware device that retrieves the capabilities of the target programmer that has been added to the programming stream, firmware that operates in conjunction with the hardware device, and software that executes on the host server 102. A target capabilities list is defined as a table of attributes that can affect the operation of the first target programmer 104 through the Nth target programmer 116 and can be maintained for the selected programming stream. The target capabilities list can include the amount of the data buffer 106, of FIG. 1, allocated to the programming stream, the number of the electronic devices 107 that are concurrently programmed, an inventory of available units of the electronic device 107 to be programmed, or a combination thereof.

If the check for new targets block 208 determines that no units of the first target programmer 104 through the Nth target programmer 116 has been added to the programming stream or after the get target information block 210 has created the target capabilities list, the flow proceeds to a target unsubscribe block 212. The target unsubscribe block 212 can be implemented as a combination of a hardware device that keeps track of all active transactions, firmware that operates in conjunction with the hardware device, and software that executes on the host server 102. The target unsubscribe block 212 checks to determine if any of the first target programmer 104 through the Nth target programmer 116 has requested to be dropped from the programming stream. The unsubscribe request can be posted by the first target programmer 104 through the Nth target programmer 116 when they are about to complete their portion of the programming stream and may require transmission of missing buffers from the data image 105, of FIG. 1.

If the target unsubscribe block 212 determines that there is an unsubscribe request from at least one of the first target programmer 104 through the Nth target programmer 116, the flow proceeds to a get missed buffers block 214. In the get missed buffers block 214 a status request is sent from the host server 102 to any of the first target programmer 104 through the Nth target programmer 116, that may have requested to be unsubscribed from the programming stream. The flow then proceeds to a check missing buffers block 216.

The check missing buffers block 216 determines whether any of the first target programmer 104 through the Nth target programmer 116 that requested to be unsubscribed from the programming stream has missing buffers from the data image 105. The at least one of the first target programmer 104 through the Nth target programmer 116 that requested to be unsubscribed from the programming stream will have responded with a list of the missing buffer addresses. If the check missing buffers block 216 determines that there are missing buffers that are required to complete the programming stream, the flow proceeds to a notify addresses block 218.

The notify addresses block 218 can be implemented as a combination of a hardware device that receives the missing buffers message, firmware that operates in conjunction with the hardware device, and software that executes on the host server 102. The notify addresses block 218 compiles a missing buffers message that indicates what buffers are required to satisfy the first target programmer 104 through the Nth target programmer 116 that requested to be unsubscribed from the programming stream. The flow then proceeds to a schedule stream block 220 that can compile the missing buffers that may be non-linear in nature depending on the number of requests from the first target programmer 104 through the Nth target programmer 116. The first target programmer 104 through the Nth target programmer 116 can receive the broadcast messages in an out-of-order sequence. The first target programmer 104 through the Nth target programmer 116 can assemble the broadcast messages for later programming or immediately program the electronic devices 107.

The flow then proceeds to a host optimize block 222. The host optimize block 222 can be implemented as a combination of a hardware device, firmware that operates in conjunction with the hardware device, and software that executes on the host server 102. The host optimize block 222 allows the host server 102 to make any changes to the buffer transmission speed, target disable, message order, or other parameters that can optimize the programming stream. The flow then proceeds to a check for subscribed targets block 226.

If the check missing buffers block 216 determines that there are no missing buffers required, the flow proceeds to an unsubscribe targets block 224. The unsubscribe targets block 224 removes any of the first target programmer 104 through the Nth target programmer 116, that requested to be unsubscribed, from the list of subscribed targets for a particular programming stream. The flow then proceeds to the check for subscribed targets block 226.

The check for subscribed targets block 226 determines if there are any subscribed targets remaining in the programming stream. If there are no subscribed targets remaining for the programming stream, the flow proceeds to the stream shut-down check 204 to terminate the programming stream. If however the check for subscribed targets block 226 determines that there are still subscriptions for any of the first target programmer 104 through the Nth target programmer 116, the flow proceeds to a broadcast data block 228.

The broadcast data block 228 provides a broadcast message containing data for any of the first target programmer 104 through the Nth target programmer 116 that is subscribed to the programming stream. The flow then proceeds to a check end-of-file block 230. The check end-of-file block 230 can be implemented as a combination of a hardware device, firmware that operates in conjunction with the hardware device, and software that executes on the host server 102.

If the check end-of-file block 230 determines that the end of the data image 105 has been reached the flow proceeds to a go to data start block 232. The go to data start block 232 can initialize the broadcast pointer to the beginning of the data image 105 for the programming stream. The flow then proceeds to the stream shut-down check 204 to determine whether the programming stream is completed and should be terminated.

It has been discovered that the host data transfer 200 of the device programming system 100, of FIG. 1, can support the asynchronous programming of the electronic device 107 by broadcasting the programming stream to multiple of the first target programmer 104 through the Nth target programmer 116. The first target programmer 104 through the Nth target programmer 116 can asynchronously join the programming stream and program the electronic device 107 in an out-of-order programming process when required.

Figure 3:
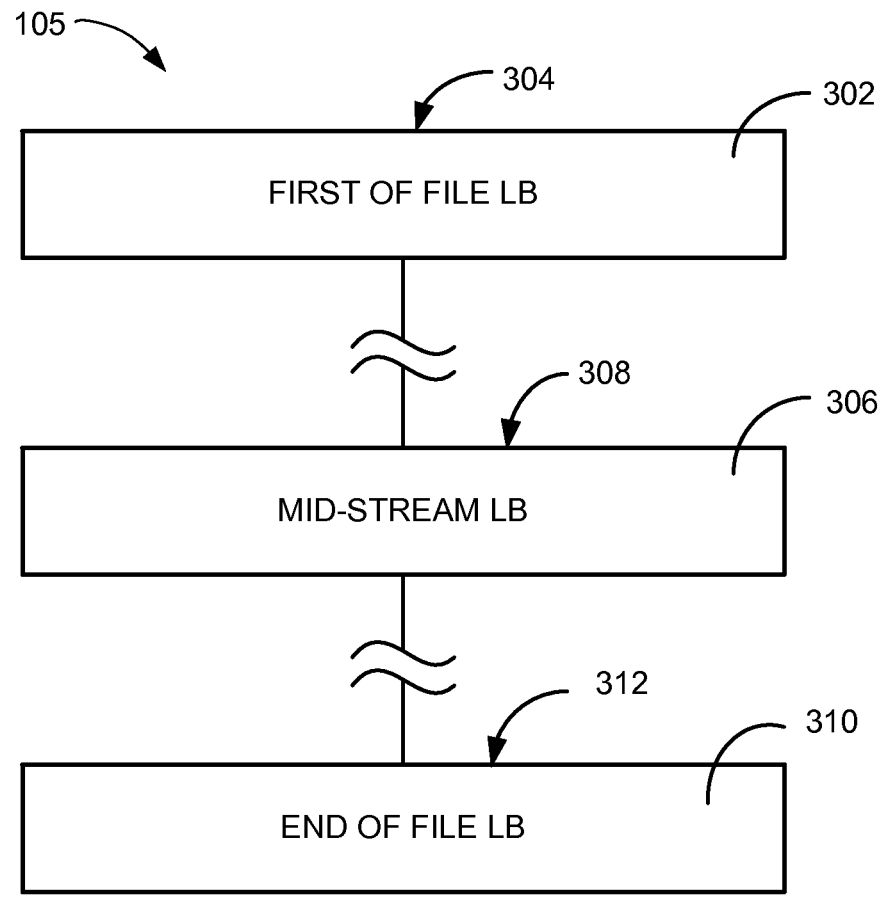
FIG. 3 is a block diagram of the data image of FIG. 1.

Referring now to FIG. 3, therein is shown a block diagram of the data image 105, of FIG. 1. The block diagram of the data image 105 depicts a first of file logical block 302, which can be the initial logical block of any number of the logical blocks that make up the data image 105. The first of file logical block can have an initial logical block address 304.

A mid-stream logical block 306 can have an Xth logical block address 308. The mid-stream logical block 306 can be a starting logical block for any of the first target programmer 104, of FIG. 1, through the Nth target programmer 116, of FIG. 1, that may have subscribes to the data stream after the first of file logical block 302 was broadcast. The mid-stream logical block 306 can be any of the logical blocks that are not the first of file logical block 302 or an end of file logical block 310. The mid-stream logical block 306 can be the starting point for any of the first target programmer 104, of FIG. 1, through the Nth target programmer 116, of FIG. 1, that may have asynchronously subscribed to the broadcast data stream. The mid-stream logical block 306 can represent an arbitrary starting point for accessing the data image 105.

The end of file logical block 310 can have a Yth logical block address 312. The end of file logical block 310 may signal the completion of the programming job for at least one of the first target programmer 104 through the Nth target programmer 116. Any of the first target programmer 104 through the Nth target programmer 116 that may have subscribed after the initial broadcast of the first of file logical block 302 can remain subscribed to the broadcast of the data image 105.

The continuation of the broadcast of the logical blocks that make up the data image 105 will start again with the re-broadcast of the first of file logical block 302. The broadcast will continue until all of the first target programmer 104 through the Nth target programmer 116 have received all of the logical blocks in the data image 105.

It is understood that the data image 105 can be of any size and is not limited by the memory size of the first target programmer 104 through the Nth target programmer 116. It is further understood that the size of the first of file logical block 302, mid-stream logical block 306, and the end of file logical block 310 can be of any byte count that is negotiated between the host server 102, of FIG. 1, and the first target programmer 104 through the Nth target programmer 116.

Figure 4:
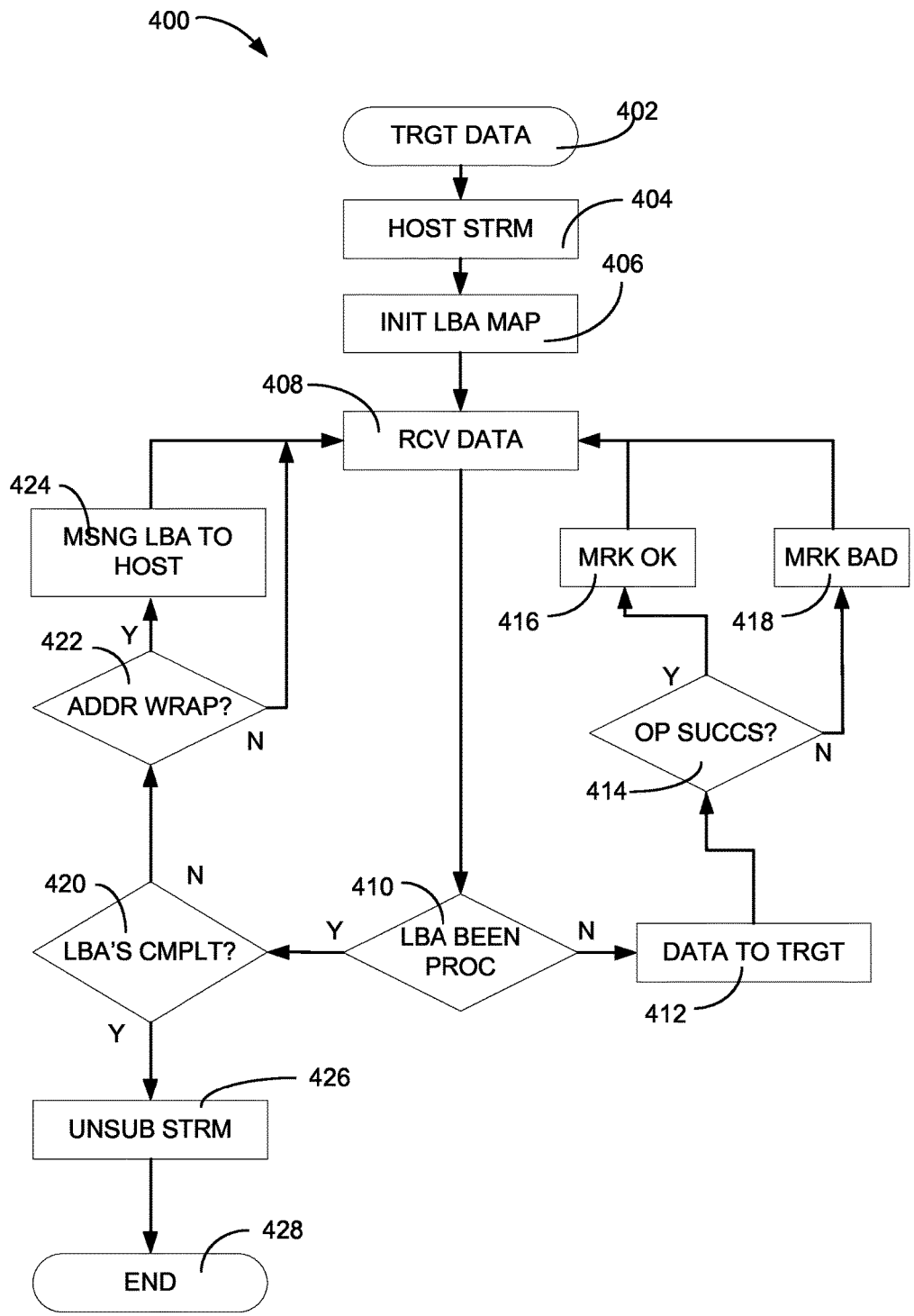
FIG. 4 is an operational flow diagram of a target data transfer in an embodiment of the present invention.

Referring now to FIG. 4, therein is shown an operational flow diagram of a target data transfer 400 in an embodiment of the present invention. The operational flow diagram of the target data transfer 400 depicts a target data entry 402. In the target data entry 402, a programming job has been initiated in any of the first target programmer 104, of FIG. 1, through the Nth target programmer 116, of FIG. 1, and the data image 105, of FIG. 1, is required in order to complete the programming job.

In order to transfer the data image 105, the flow proceeds to a subscribe to host stream block 404. The data image 105 can be stored in the host server 102, of FIG. 1, and is transferred in a broadcast fashion to the first target programmer 104 through the Nth target programmer 116. The subscribe to host stream block 404 initiates the subscription to the broadcast of the data image 105.

The flow then proceeds to an initialize logical block address 406. The initialization of the logical block address 406 provides a list of the logical blocks of the data image 105 that are required for the programming job that is pending in the first target programmer 104 through the Nth target programmer 116.

It has been discovered that the duration of the programming job, performed on multiple of the first target programmer 104 through the Nth target programmer 116, can be reduced by programming the logical blocks out of order or without starting at the first of file logical block 302, of FIG. 3. This process provides an overlap of the programming of the logical blocks without delaying the start of the programming job on any of the first target programmer 104 through the Nth target programmer 116 that subscribed after the broadcast of the data image 105 commences. The asynchronous nature of the out-of-order transferring and programming of the electronic devices 107, of FIG. 1, that were subscribed late provides an overlapped process that shortens the over-all programming time as compared to previous methods.

The flow proceeds to a receive broadcast message 408, which provides the first of file logical block 302 or the mid-stream logical block 306, of FIG. 3, from the data image 105. The data received from the broadcast can be held in the data buffer 106 temporarily. Any subsequent data blocks can be broadcast in successive order to any of the first target programmer 104 through the Nth target programmer 116 that are subscribed to the broadcast.

The flow then proceeds to a check logical block address done 410. The check logical block address done 410 compares the Xth logical block address 308, of FIG. 3, of the newly received data block. If the check logical block address done 410 determines that the Xth logical block address 308 has not been processed, the flow proceeds to a data to target block 412.

The data to target block 412 programs the data into the non-volatile memory 108, of FIG. 1, located in the electronic device 107, of FIG. 1. The flow then proceeds to a verify operation successful 414. The verify operation successful 414 can read the content of the non-volatile memory 108 and compare to the content of the data buffer 106. If the verify operation successful 414 determines that the data in the non-volatile memory 108 does match the content of the data buffer 106, the flow proceeds to a mark logical block address good 416.

If the verify operation successful 414 determines that the data in the non-volatile memory 108 does not match the content of the data buffer 106, the flow proceeds to a mark logical block address bad 418. The mark logical block address bad 418 can perform additional steps in order to indicate a failure to program on any of the electronic device 107 that does not verify correctly.

From either the mark logical block address good 416 or the mark logical block address bad 418, the flow proceeds to the receive broadcast message 408 in order to receive the next logical block of the data image 105.

If the check logical block address done 410 determines that the Xth logical block address 308 has already been received the flow proceeds to a check all logical blocks done 420. The check all logical blocks done 420 can determine whether all of the logical blocks in the current domain have been received and programmed into the non-volatile memory 108 of the electronic device 107. If all of the logical blocks have been processed, the flow proceeds to an unsubscribe from data stream 426. The unsubscribe from data stream 426 sends an unsubscribe and terminate message to the host server 102, of FIG. 1. The flow then proceeds to a target end 428 to exit the target data transfer 400.

If the check all logical blocks done 420 determines that there are additional logical blocks to transfer, the flow proceeds to an address wrap block 422 to determine whether the logical block address has wrapped since the stream was subscribed. If the address wrap block 422 determines that the logical block address has not wrapped, meaning that there are additional logical block addresses remaining to be broadcast, the flow proceeds to the receive broadcast message 408 in order to receive the next logical block of the data image 105.

If the address wrap block 422 determines that the logical block address has wrapped, meaning that all of the logical block addresses of the data image 105 have been broadcast for the first time, the flow proceeds to a send missing logical block address 424. The send missing logical block address 424 can determine which of the logical blocks have been missed by the first target programmer 104 through the Nth target programmer 116 from the data image 105 then sends an unsubscribe message with missing blocks notification. The unsubscribe message alerts the host server 102 that any of the first target programmer 104 through the Nth target programmer 116 is ready to receive the missing blocks and sign-off from the broadcast. The flow then proceeds to the receive broadcast message 408 in order to await the broadcast of the missing logical blocks.

It has been discovered that a high volume of the electronic device 107 can be programmed in a broadcast communication process by the device programming system 100, of FIG. 1, with only a minor increase from the time required to program a single unit of the electronic device 107.

Thus, it has been discovered that the device programming system of the present invention furnishes important and heretofore unknown and unavailable solutions, capabilities, and functional aspects for high volume manufacturing that requires the programming of any of the electronic device 107 having the non-volatile memory 108.

Figure 5:
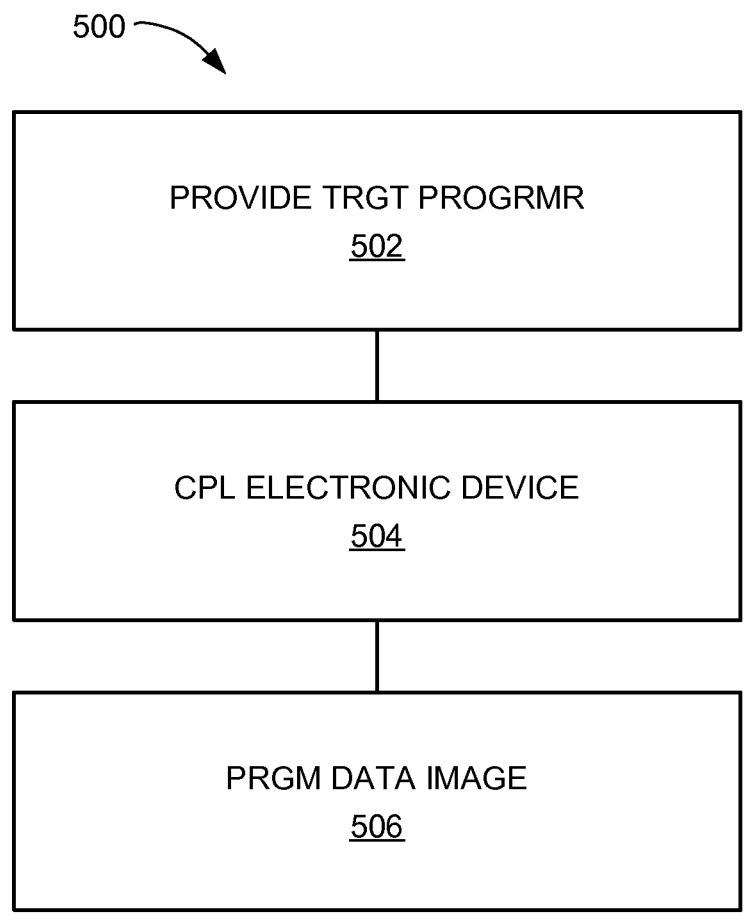
FIG. 5 is a flow chart of a method of operation of a device programming system in a further embodiment of the present invention.

Referring now to FIG. 5, therein is shown a flow chart of a method 500 of operation of the device programming system 100 in a further embodiment of the present invention. The method 500 includes: providing a target programmer, having a programming bus in a block 502; coupling an electronic device, having a non-volatile memory, to the target programmer by the programming bus in a block 504; and programming a data image into the non-volatile memory by the target programmer including: subscribing to a broadcast message, receiving a logical block, of the data image, by the broadcast message for programming the non-volatile memory, and sending an unsubscribe message after receiving all of the logical blocks of the data image from the broadcast message in a block 506.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically operating device programming systems fully compatible with conventional manufacturing methods or processes and technologies Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a device programming system comprising:
 coupling a plurality of electronic devices, each having a non-volatile memory, to a target programmer of a flash memory programming system by a programming bus;
 coupling a host server to the target programmer; and
 programming a data image into the non-volatile memory of each of the electronic devices asynchronously using the target programmer including:
  subscribing to a broadcast message of a programming stream of the data image at a mid-stream logical block address with the programming stream already started, receiving a logical block of the data image by the broadcast message in a data buffer in the target programmer for programming the non-volatile memory, copying the logical block concurrently into the non-volatile memory of the plurality of the electronic devices, verifying the content of the non-volatile memory by comparing the non-volatile memory to the data buffer, sending an unsubscribe message from the target programmer to the host server after detecting a logical block address wrap with a logical address of the logical block repeating the mid-stream logical block address, the unsubscribe message having a list of missing buffers for the data image, and receiving the missing buffers for the target programmer in a sequence based on the unsubscribe message.

2. The method as claimed in claim 1 wherein providing the target programmer includes providing a first target programmer and a second target programmer.

3. The method as claimed in claim 1 wherein providing the data buffer in the target programmer for receiving the logical block from the broadcast message.

4. The method as claimed in claim 1 further comprising initializing a logical block address map in the target programmer.

5. The method as claimed in claim 1 wherein receiving the logical block includes receiving a mid-stream logical block.

6. A method of operation of a device programming system comprising:

coupling a host server to a target programmer;

coupling a data broadcast bus from the host server to the target programmer;

coupling a plurality of electronic devices, each having a non-volatile memory, to a target programmer of a flash memory programming system by a programming bus; and programming a data image into the non-volatile memory of each of the electronic devices concurrently and asynchronously using the target programmer including:

subscribing to a broadcast message of a programming stream of the data image at a mid-stream logical block address with the programming stream already started, receiving a logical block of the data image by the broadcast message in a data buffer in the target programmer for programming the non-volatile memory, copying the logical block concurrently into the non-volatile memory of the plurality of the electronic devices, verifying the content of the non-volatile memory by comparing the non-volatile memory to the data buffer, sending an unsubscribe message from the target programmer to the host server after detecting a logical block address wrap with logical address of the logical block repeating the mid-stream logical block address, the unsubscribe message having a list of missing buffers for the data image, receiving the missing buffers for the target programmer in a sequence based on the unsubscribe message.

7. The method as claimed in claim 6 wherein providing the target programmer includes providing a first target programmer, a second target programmer, a third target programmer, through an Nth target programmer.

8. The method as claimed in claim 6 wherein providing the data buffer in the target programmer for receiving the logical block from the broadcast message including receiving, by a first target programmer, a second target programmer, a third target programmer, through an Nth target programmer, the broadcast message having the logical block.

9. The method as claimed in claim 6 further comprising initializing a logical block address map in the target programmer; and wherein:

initializing the logical block address map includes initializing a first target programmer, a second target programmer, a third target programmer, through an Nth target programmer with the logical block address map.

10. The method as claimed in claim 6 wherein receiving the logical block includes receiving a mid-stream logical block, a first of file logical block, and an end of file logical block.

11. A device programming system comprising:

a host server having a data image;

a target programmer of a flash memory programming system, coupled to the host server, the target programmer for subscribing to a broadcast message of a programming stream of the data image at a mid-stream logical block address with the programming stream already started;

a plurality of electronic devices, each having a non-volatile memory, coupled to the target programmer by a programming bus; and a data buffer in the target programmer configured to receive a logical block of the broadcast message for programming into the non-volatile memory, copy the logical block concurrently into the non-volatile memory of the plurality of the electronic devices, and verify the content of the non-volatile memory by comparing the non-volatile memory to the data buffer; and wherein:

the target programmer is configured to send an unsubscribe message to the host server after detecting a logical block address wrap with a logical address of the logical block repeating the mid-stream logical block address, the unsubscribe message having a list of missing buffers for the data image, and the target programmer is configured to receive the missing buffers in a sequence based on the unsubscribe message.

12. The system as claimed in claim 11 wherein the target programmer includes a first target programmer and a second target programmer.

13. The system as claimed in claim 11 wherein the data buffer in the target programmer includes a first target programmer and a second target programmer each having the data buffer.

14. The system as claimed in claim 11 further comprising a logical block address map in the data buffer of the target programmer.

15. The system as claimed in claim 11 further comprising a data broadcast bus between the host server and the target programmer.

16. The system as claimed in claim 11 wherein the target programmer includes a first target programmer and a second target programmer coupled to the host server.

17. The system as claimed in claim 16 wherein the target programmer includes a third target programmer through an Nth target programmer.

18. The system as claimed in claim 16 further comprising a data broadcast bus from the host server to the first target programmer and the second target programmer.

19. The system as claimed in claim 16 further comprising a logical block address map in the data buffer of the first target programmer and the second target programmer.

20. The system as claimed in claim 16 wherein the data buffer is configured to receive a mid-stream logical block, a first of file logical block, and an end of file logical block.

* * * * *